United States Patent [19]

Thompson

[11] Patent Number: 4,972,224
[45] Date of Patent: Nov. 20, 1990

[54] EXPOSURE CONTROL SYSTEM FOR A FIXED APERTURE CAMERA

[75] Inventor: Bennie Thompson, Framingham, Mass.

[73] Assignee: Polaroid Corporation, Cambridge, Mass.

[21] Appl. No.: 399,085

[22] Filed: Aug. 28, 1989

[51] Int. Cl.[5] .................... G03B 27/00; G03B 27/72
[52] U.S. Cl. ............................... 355/1; 355/50; 355/71
[58] Field of Search ............ 355/1, 71, 50, 237, 355/238

[56] References Cited

U.S. PATENT DOCUMENTS

| | | | |
|---|---|---|---|
| 3,415,644 | 12/1968 | Land | 430/220 |
| 3,594,164 | 7/1971 | Rogers | 430/220 |
| 3,753,392 | 8/1978 | Land | 354/86 |
| 4,416,530 | 11/1983 | Herbert et al. | 355/71 |
| 4,641,944 | 2/1987 | Honda et al. | 355/71 |

FOREIGN PATENT DOCUMENTS

56-70568  6/1981  Japan .................... 355/238

Primary Examiner—L. T. Hix
Assistant Examiner—D. Rutledge
Attorney, Agent, or Firm—John J. Kelleher

[57] ABSTRACT

A fixed aperture, compact camera for photographically copying a selected portion of an illuminated image is provided with an exposure control system that includes a scanning, graded-index microlens array and a pair of superposed light polarizing elements interposed between the selected illuminated image portion and the microlens array with a light transmission axis of one light polarizing element being rotatable with respect to a light transmission axis of the other light polarizing element. In operation a camera operator manually sets the angle between these two transmission axes prior to exposure, in accordance with his subjective determination of image-illumination intensity and therefor the light intensity of the image portion available for transmission to a camera focal plane, during exposure. The operator then actuates the camera to thereby cause the microlens array to scan at a fixed rate, across a light path between the illuminated image and the camera's focal plane and thereby transfer the selected illuminated image portion, of the proper light intensity, to photosensitive material located at the camera's focal plane.

10 Claims, 5 Drawing Sheets

EXPOSURE CONTROL SYSTEM FOR A FIXED APERTURE CAMERA

BACKGROUND OF THE INVENTION

1. Field of the Invention

The present invention relates to a fixed aperture, compact camera for photographically copying a portion of an illuminated image, in general, and to a manually adjustable exposure control system for such a camera, in particular.

2. Description of the Prior Art

At the present time there is a fairly large need for a relatively simple, portable and compact camera that is capable of expeditiously making a photograph or hard copy of all or a selected portion of an illuminated transparent image. In the medical field, for example, it is fairly normal practice to make a multiple image set of x-rays or film transparencies of selected views of a patient's anatomy in order to provide a treating (or consulting) physician with an additional tool for diagnosing the patient's illness. Standard practice in such instances is to provide a single copy of each anatomical view produced by x-ray, or other imaging means, for inclusion in the patient's case file.

Typically, a treating physician views 14×17 inch transparencies wherein each transparency includes a single x-ray image or multiple smaller images produced either by Computed Tomography (CT) or Magnetic Resonance Imaging (MRI). In many (if not all) instances, the treating physician would like to have a copy of one or two individual images or portions thereof per patient case that best establishes the diagnosis of pathology (or normalcy) for his own records and for the records of a consulting physician. It is only in rare instances where a physician needs a complete imagery set for his own records. To obtain such individual images today is an unwieldy, time consuming and expensive process, even at a very large medical facility, and is therefore rarely used.

There is a major disadvantage associated with a physician's inability to promptly obtain a copy of selected portions of his patient's diagnostic images. These images theoretically belong to the patient, and in a medical facility access to them is generally controlled by the radiology department. With very large numbers of diagnostic image sets to take care of, it is not uncommon for the radiology department in such a facility to lose or temporarily misplace a substantial number of the diagnostic images placed in its care. Therefore, if a physician is not able to obtain a copy of the pertinent images during the relatively short period of time that he has personal contact with the entire case file, i.e., while he is diagnosing or formally consulting, it is highly unlikely that he will have easy access to these images at some time in the future. The lack of easy and repeated access to a patient's diagnostic images is a fairly common problem in the medical field.

A compact, hand-held camera for photographing an illuminated image, such as that formed by x-rays on a film transparency, is described in commonly assigned, copending U.S. patent application Ser. No. 202,480, filed June 6, 1988 by W. Hudspeth. The camera functions, in part, by placing an opening in the camera's housing, through which a photographic image is formed, directly over that portion of the total illuminated image selected to be photographed and in direct contact with the film transparency. This particular camera owes its compactness, in large part, to the use of an optical path shortening graded-index microlens array that couples a selected film transparency portion to be photographed, to the camera's film plane. The microlens array is driven across the above-noted opening by a manually controlled, variable-speed, dc motor for the purpose of transferring an illuminated image present at this opening to a photosensitive material located in an exposure position at the camera's film plane. The camera operator selects the desired microlens array scanning speed, prior to exposure, based on is subjective determination as to the intensity of the light illuminating the image to be copied. If the transparency is over-illuminated, the microlens array is driven across the opening through which a photographic image is formed at a relatively fast speed, whereas the microlens array is driven across this opening a relatively slow speed if the transparency is under-illuminated. While this type of exposure control system is quite effective, the component parts thereof such as the variable speed motor and controls therefor introduce a significant cost penalty into the overall cost of the camera.

SUMMARY OF THE INVENTION

It is a primary object of the present invention, therefore, to provide a simplified and low-cost exposure control system for a substantially fixed aperture, hand-held, compact camera.

It is another object of the present invention to provide an exposure control system for a substantially fixed aperture, hand-held, compact camera that requires a minimum amount of space on or within the camera to incorporate such a system.

It is a further object of the present invention to provide an exposure control system for a substantially fixed aperture, hand-held, compact camera that will consume a minimum of electrical power.

Other objects, features and/or advantages of the present invention will be readily apparent from the following detailed description of a preferred embodiment thereof when taken in conjunction with the accompanying drawings.

In accordance with the present invention a simplified and low cost exposure control system for a substantially fixed aperture, hand-held, compact camera is provided. The exposure control system includes a scanning, graded-index microlens array and at least a pair of superposed light polarizing elements with each such element having a particular light transmission axis and with one light polarizing element being rotatable with respect to another. When the camera is placed in its exposure position, the light polarizing elements are located between a selected portion of an illuminated image and the microlens array. In operation a camera operator manually sets the angle between the two transmission axes prior to exposure, in accordance with his subjective determination of image-illumination intensity and therefore the light intensity of the image portion available for transmission to a camera focal plane, during exposure. The operator subsequently actuates the camera to thereby cause said microlens array to scan across a light path between said illuminated image portion and said camera's focal plane and thereby transfer said selected illuminated image portion, of the proper intensity, to photosensitive material located thereat.

DESCRIPTION OF THE PREFERRED EMBODIMENT

Figure 1A:
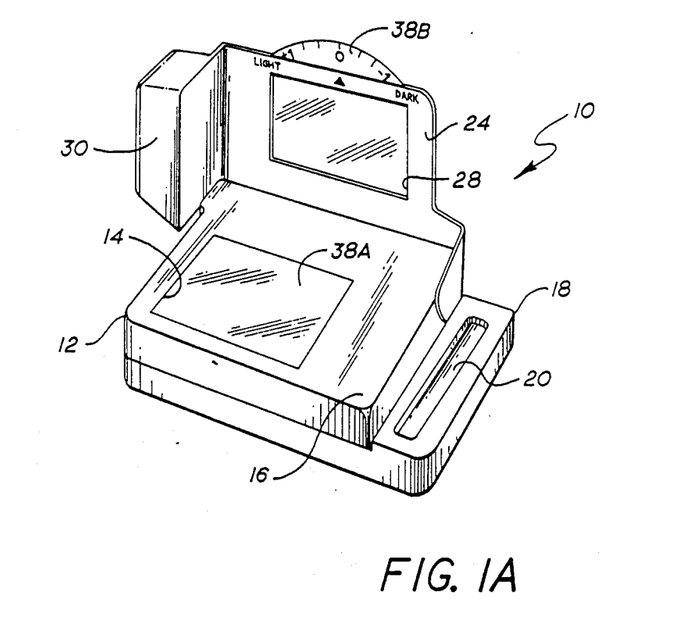
FIG. 1A is a perspective view of the illuminated image copying apparatus of the present invention with its frame member shown in its upright or image framing position.
Figure 1B:
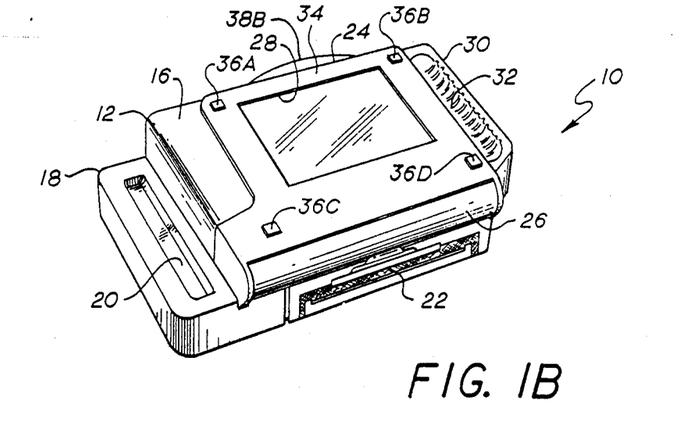
FIG. 1B is a perspective view of the illuminated image copying apparatus of the present invention with its frame member shown in its folded or exposure position.
Figure 1C:
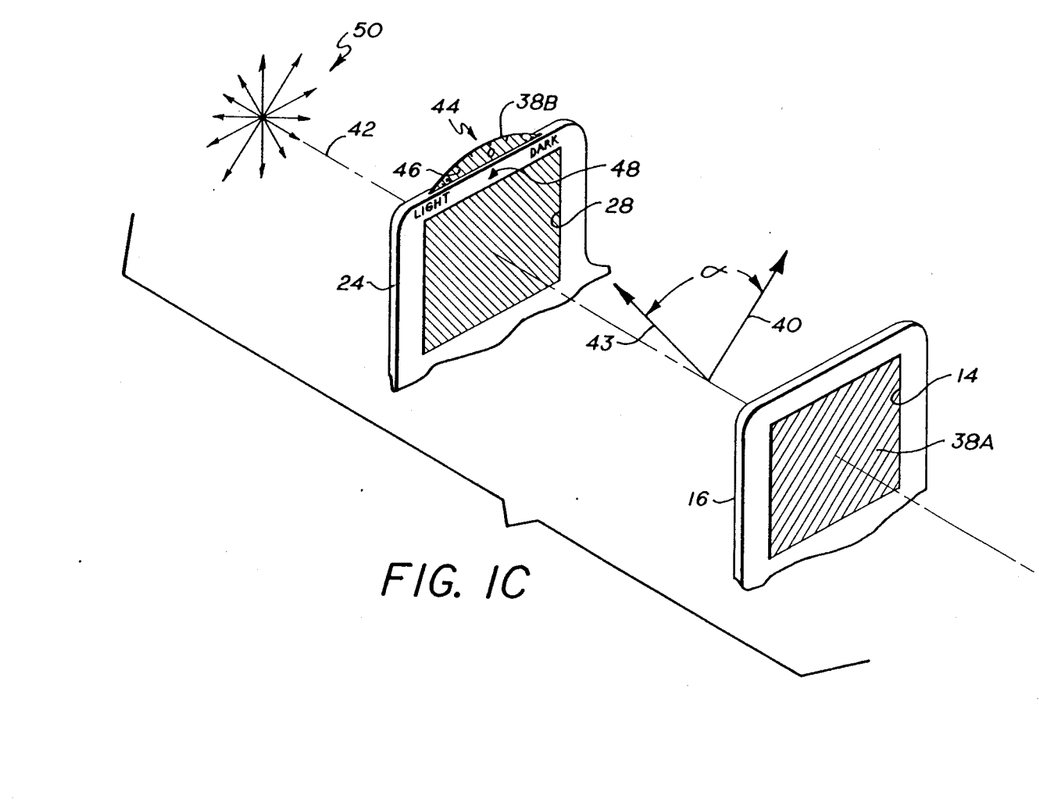
FIG. 1C is a detail of an enlarged and exploded perspective view of the camera showing a polarizing element supported by the camera's body and a polarizing element supported by the camera's frame member in operative, superposed relationship with one another when the camera's frame member is in the position shown in FIG. 1B.

With reference to FIGS. 1A, 1B and 1C of the drawings, numeral 10 generally indicates portable and highly compact apparatus for photographically copying a selected portion of an illuminated image that employs a preferred embodiment of the exposure control system of the present invention. As shown in FIGS. 1A, 1B and 1C, the apparatus 10 includes a housing 12 having a generally rectangular opening 14 formed in an upper wall 16 thereof that provides the only external opening through which light from an illuminated image may pass for image copying purposes. The housing 12 includes a hand grip 18 projecting from a side thereof having a recess 20 therein for accepting the tips of an operator's right fingers in preparation for and during camera operation. The housing 12 also includes a light-sealed slot 22 through which a later to be described exposed film unit is advanced into ambient light after an illuminated image present at the housing opening 14 has been transferred to the film unit by the apparatus 10.

The apparatus 10 is provided with a generally planar frame member 24 that is pivotally attached near an end 26 of the housing 12. The frame member 24 is manually pivotable between an upright or framing position, as shown in FIG. 1A, where the frame member 24 is approximately at right angles with respect to the housing openinig 14, and a folded or exposure position, as shown in FIG. 1B, where an opening 28 in the frame member 24 overlies the opening 14 in the housing 12, in registration therewith. The frame member 24 includes a hand grip 30 projecting from a side thereof having a recess 32 therein for accepting the tips of an operator's left fingers in preparation for and during camera operation. An outer surface 34 of the frame member 24 is provided with four pad members 36A, 36B, 36C and 36D, adhesively attached thereto, whose outer surfaces establishes a plane for locating an illuminated transparent image at the frame member opening 28.

The camera 10 also includes a pair of conventional light filtering or polarizing element 38A and 38B that cooperatively control the amount of illuminated-image-light transmitted to the film plane thereof through the housing opening 14. FIG. 1C is a detail of an exploded perspective view of the camera 10 showing the light polarizing element 38A supported, in a fixed position, in the camera housing opening 14 and showing the light polarizing element 38B rotatably mounted in the opening 28 of the frame member 24. The light transmission axis of the light polarizing element 38A is in a fixed direction such as that indicated by the arrow 40. The light transmission axis of the light polarizing element 38B is manually rotatable about an axis 42 with respect to the light transmission axis of the fixed polarizing element 38A to, for example, a direction such as that indicated by the arrow 43 forming the angle $\alpha$ therebetween. As shown in FIG. 1C, a light transmission scale 44 is formed on an outer surface 46 of the rotatable light polarizing element 38B. The scale has a "0" or normal setting and extends from a "+1" to a "−1" setting above and below this normal setting, respectively. When an index mark 48 on the frame member 24 is manually aligned with the "+1" setting, the transmission axes of the light polarizing elements 38A and 38B are either in alignment or at a minimum angle with respect to one another. In this "+1" position a maximum amount of light from an unpolarized light source such as a light source 50, is transmitted by the pair of superposed light polarizing element 38A and 38B when illuminated by such a light source. Conversely, when the index mark 48 on the frame member 24 is manually aligned with the "−1" setting, the transmission axes of the light polarizing elements are either orthogonal or are at a maximum angle with respect to one another. In this "−1" position a minimum amount of light from the unpolarized light source 50 is transmitted by the pair of superposed light polarizing element 38A and 38B when they are so illuminated. It is preferred that in the present invention the light polarizing elements comprise a suitable linear light polarizing synthetic plastic material such as that commercially available from Polaroid Corporation, Cambridge, Mass.

Figure 2:
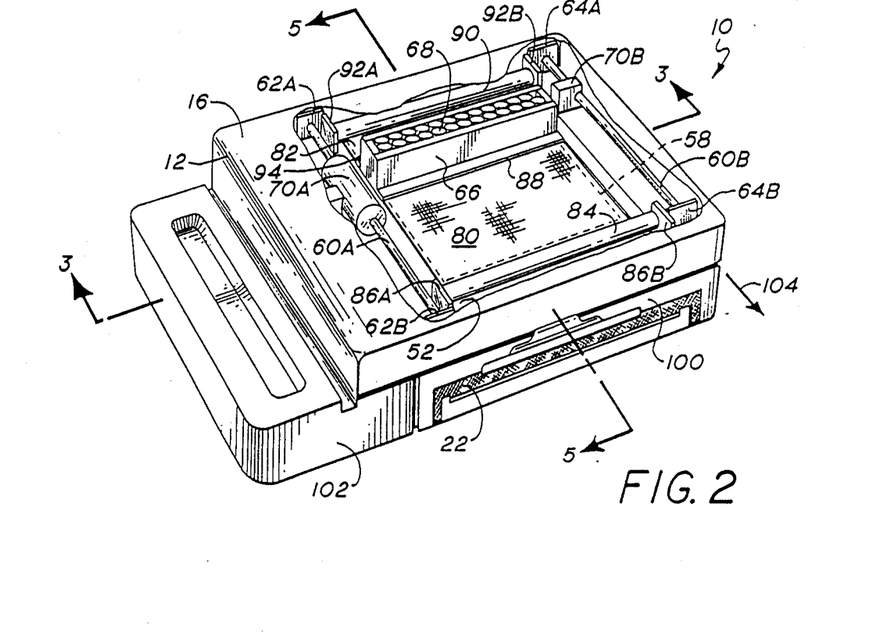
FIG. 2 is the same as FIG. 1B except that the frame member has been removed and portions of an upper housing wall have been broken away to facilitate describing internal copying apparatus portions.
Figure 3:
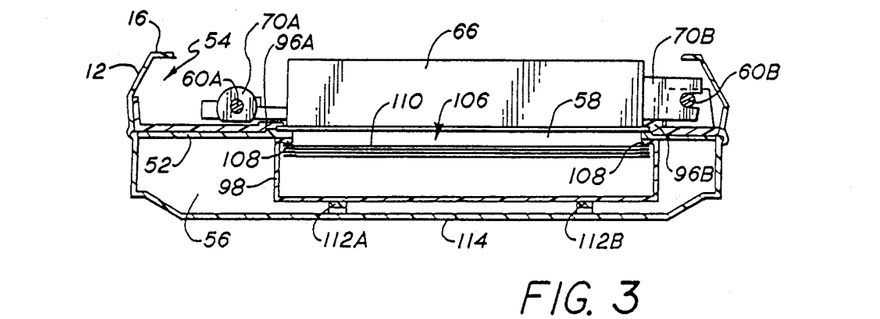
FIG. 3 is a sectional view taken on the line 3—3 in drawing FIG. 2.

Reference should now be made to FIG. 2 which is the same as that shown in FIG. 1B except that frame member 24 has been removed and upper wall 16 has been broken away to facilitate the description of internal portions of the compact copying apparatus 10. Reference should also be made to FIG. 3 which is a partial sectional view taken on the line 3—3 in drawing FIG. 2. As shown in FIGS. 2 and 3, the copying apparatus 10 includes an intermediate wall 52 that is spaced from and generally parallel to the upper wall 16, a wall that divides the interior of the housing 12 into an upper chamber 54 and a lower lighttight chamber 56. Intermediate wall 52 includes a rectangular opening 58 that is approximately the same size as the opening 14 (FIG. 1A) in the upper wall 16 and is in registration therewith.

Linear guide rods 60A and 60B, of circular cross section, are mounted in a fixed position on opposite sides of the intermediate wall opening 58. Rods 60A and 60B are mounted parallel to one another and generally parallel to an adjacent side of the rectangular opening 58. Rod 60A is mounted to the wall 52 by a pair of bosses 62A and 62B while rod 60B is mounted to the wall 52 by a similar pair of bosses 64A and 64B. A lens assembly 66 and graded-index, microlens array 68 forming a portion thereof is slidably supported on the guide rods 60A and 60B by a pair of guides 70A and 70B, respectively.

The microlens array 68 is a commercially available lens strip comprised of a plurality of graded-index, image-forming cylindrical lenses that are optically aligned and rigidly mounted with respect to one another. The function of the microlens array 68 is to transfer an illuminated image located at an object plane defined by the outer surfaces of the frame member pads 36A, 36B, 36C and 36D adjacent the object end of said array, to an image or focal plane in the lower lighttight chamber 56 of the housing 12 at the opposite or image end of said array, within a relatively short distance. In the copy apparatus 10 of the present invention this distance is equal to 1.503 inches. One such lens array is sold by NSG America Inc. of Somerset, NJ under their registered trademark SELFOC.

Figure 4:
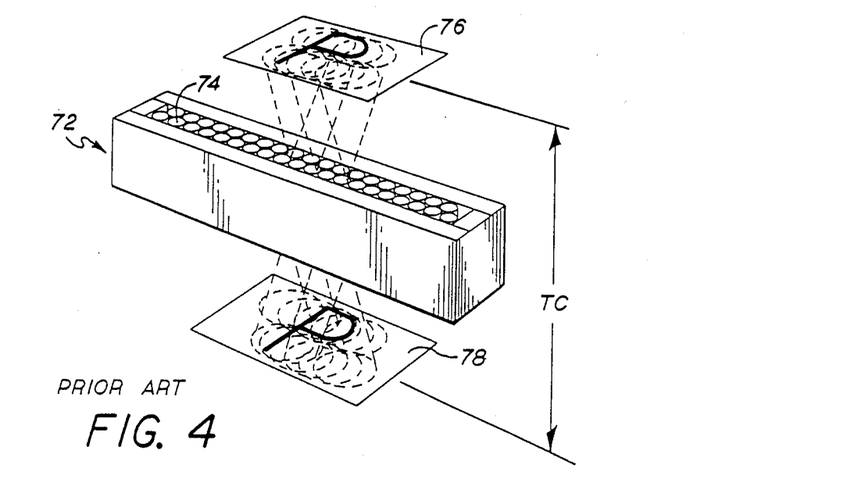
FIG. 4 is a perspective view of a commercially available graded-index, microlens array of the type employed in the copying apparatus of the present invention.

The typical lens array is comprised of one or two rows of graded-index microlenses, each with equal dimensions and optical properties. Prior art FIG. 4 is a perspective view of a commercially available lens assembly 72 incorporating a graded-index, microlens array 74 of the type employed in the copying apparatus 10. As shown in FIG. 4, the lens array 74 includes an object plane 76 spaced from the object end of the array 74 and an image plane 78 spaced from the image or other end of the array 74. An illuminated image of, for example, the letter P placed at the object plane 76 of the array 74 will be transferred to the image plane 78 by the lens array 74. The transferred image is erect (non-inverted in each of two mutually perpendicular directions) and the ratio between the size of the image at the object plane 76 and the size of the image at the image plane 78 is preferably one-to-one. The total conjugate TC, which is the distance between the object plane 76 and the image plane 78, is a matter of design choice and is primarily determined by the size of the copying apparatus housing in which it is to be employed. In the housing 12 of the copying apparatus 10 the TC for the microlens array 74 is chosen such that its object plane can be located substantially coincident with the plane defined by the outer surface of the frame member pads 36A, 36B, 36C and 36D and such that its image plane can be located substantially coincident with the film plane within the copier housing 12.

As shown in FIG. 2 a pair of shades 80 and 82, each formed of a sheet of flexible opaque material, are retractably mounted on the intermediate wall 52, with each shade covering varying portions of the intermediate wall opening 58. Shade 80 has one end attached to and wrapped on a torsion-spring-biased rod (not shown) to form a roll 84 that is, in turn, rotatably mounted on the intermediate wall 52 by a pair of bosses 86A and 86B, adjacent a side of the rectangular shaped intermediate wall opening 58. The other end of the shade 80 is attached to a flange 88 laterally extending from the bottom of the lens assembly 66, in a lighttight relation. Similarly, the shade 82 has one end attached to and wrapped on a torsion-spring-biased rod (not shown) to form a roll 90. This rod is, in turn, rotatably mounted on the intermediate wall 52 by a pair of bosses 92A and 92B, adjacent that side of the intermediate wall opening 58 directly opposite from the side of the opening that is adjacent to the roll 84. The other end of the shade 82 is attached in a lighttight relation to a flange 94 that laterally extends form the bottom of the lens assembly 60 in a direction opposite to that of the flange 88. The torsion-spring-biased rods rotatably supporting an end of either the shade 80 or 82 maintain a tension force on each of the shades and provide the force that wraps these shades onto their respective support rods to form the rolls 84 or 90 when the lens assembly 66, attached to the opposite end of each of the shades, is driven across the intermediate wall opening 58.

With continued reference to drawing FIG. 3, the sides of the shades 80 and 82 are maintained in lighttight sliding contact with those portions of the upper surface of the intermediate wall 52 adjacent the opening 58, in part, by a pair of labyrinth defining flanges 96A and 96B. In addition, the length of flanges 96A and 96B are substantially longer than the respective lengths of the adjacent sides of the opening 58 so that those portions of the shades 80 and 82 extending beyond the opening 58 and subsequently being wrapped onto or unwrapped from their respective torsion-spring-biased support rods will also be maintained in lighttight sliding engagement with those portions of the upper surface of the intermediate wall 52 adjacent the opening 58. The relationship between the lens assembly 66, the shades 80 and 82 and the structure forming the opening 58 in the intermediate wall 52 is such that any light passing through the opening 58, including the period when the lens assembly 66 is driven across the opening 58 can only pass through the microlens array 68 in the lens assembly 66.

The copying apparatus 10 incorporates a recess therein for accepting a multiple film unit cassette 98 as shown in drawing FIG. 3. Access to this recess is gained by pivoting a panel 100, forming a portion of a sidewall 102 of the housing 12, in a direction 104 as shown in drawing FIG. 2. The cassette 98 incorporates a stack of film units 106 which are spring biased toward an upper wall 108 thereof by spring means (not shown) so as to locate an uppermost film unit 110 in the film plane within the housing 12 or in an exposure position adjacent the opening 58 in the intermediate wall 52. The film units 106 are of the integral, self-developing type with each unit including a rupturable pod of processing liquid at their leading end and a trap at their trailing end for receiving any excess processing liquid, as is well known in the art. The cassette 98 may also enclose a 6 VDC battery (not shown) for supplying electrical power to the various electrical systems and subsystems within the copying apparatus 10. The copying apparatus 10 includes a pair of rails 112A and 112B on an interior surface of a bottom wall 114 of the housing 12 for supporting the film cassette 98 in position for the sequential exposure of the film units 106. For a more detailed description of integral film units of the type employed herein reference may be had to U.S. Pat. No. 3,415,644 issued to E. H. Land on Dec. 10, 1968 and U.S. Pat. No. 3,594,164 issued to H. G. Rogers on July 20, 1971.

Figure 5:
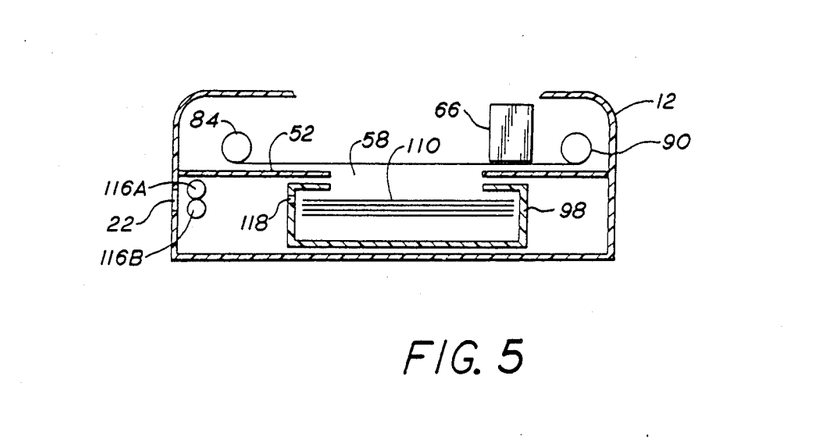
FIG. 5 is a sectional view taken on the line 5—5 in drawing FIG. 2.

With additional reference to FIG. 5 of the drawings, which is a partial sectional view taken on the line 5—5 in the drawing FIG. 2, the microlens assembly 66, having a 6 VDC motor (not shown) coupled thereto, is driven by this motor across the opening 58 in intermediate wall 52 during each exposure cycle. The microlens assembly 66 is driven across the opening 58 for the purpose of transferring an illuminated image located in the above-mentioned plane defined by the outer surfaces of the pads 36A, 36B, 36C and 36D on the frame member 24, when the copying apparatus 10 is in its exposure position, to photosensitive material such as the film unit 110 within the camera housing 12 located in an exposure position adjacent the intermediate wall opening 58. The microlens assembly 66 transfers an illuminated image located at the above-defined plane to such photosensitive material in each direction of travel across the intermediate wall opening 58. When the microlens assembly 66 is in a rest position at either side of the opening 58, the intermediate wall 52 blocks or precludes the transmission of light from an illuminated image located at the above-defined plane and exiting form the microlens array 68, to the photosensitive film unit 110.

The copying apparatus 10 is also provided with conventional apparatus (not shown) for advancing an exposed film unit such as film unit 110 into the bite of a pair of juxtaposed processing rollers 116A and 116B for film unit processing and for transporting a processed film unit through the light-sealed slot 22 and to an apparatus 10 operator. The processing rollers 116A and 116B have a separate 6 VDC drive motor coupled thereto and to a conventional pick or film unit advancing arm (not shown) such as that described in U.S. Pat. No. 3,753,392 to Land, the disclosure of which is specifically incorporated herein by reference. As explained in much greater detail in this Land '392 patent, the film advancing pick or arm reaches into a slot (not shown) in the cassette 98, engages a trailing edge of an exposed film unit such as film unit 110 and advances the exposed film unit through an exit slot 118 in the cassette 98 and into the bite of rotating processing roller pair 116A, 116B in registration with the cassette exit slot 118. The rotating processing roller pair 116A, 116B rupture the pod of processing liquid located at the leading edge of the exposed film unit and spread the contents thereof between photosensitive and image-receiving layers while simultaneously advancing the exposed film unit through the light-sealed opening 22 in the copier housing 12. Shortly after the processing liquid has been spread, a conventional limit switch (not shown) interrupts power to the processing roller drive motor and thereby terminates the rotation of the processing roller pair 116A and 116B.

OPERATION

Figure 6:
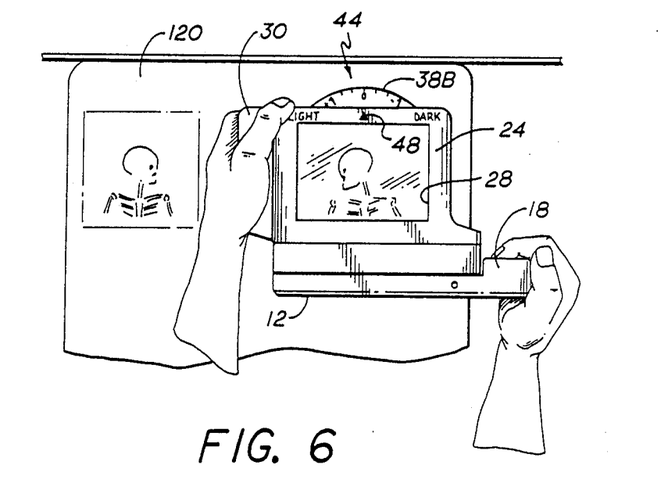
FIG. 6 is an elevational view of the copying apparatus of the present invention shown being held in its framing position against an illuminated image by an operator of the apparatus.
Figure 7:
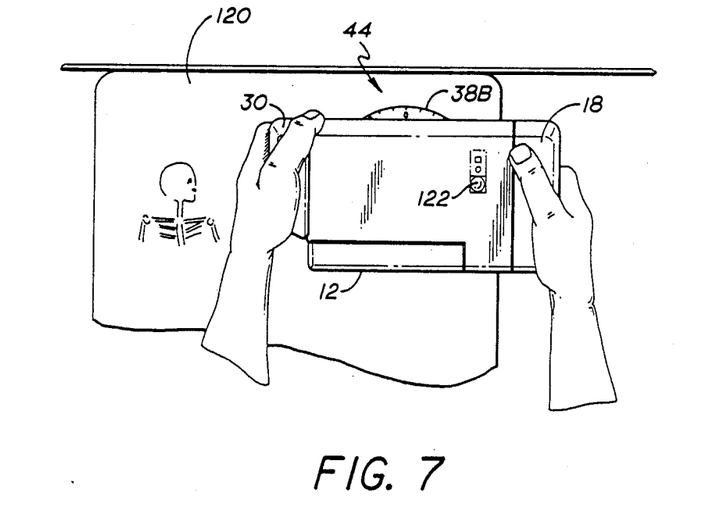
FIG. 7 is an elevational view of the copying apparatus of the present invention with the frame member being shown held in its exposure position against a portion of an illuminated image by the apparatus operator.

The sequence of operation of a typical illuminated-image transferal or copying cycle will now be described in detail. A selected portion of the illuminated image or backlit film transparency 120 shown in drawing FIGS. 6 and 7 is to be copied by the camera or copying apparatus 10. The first step in this copying process is for the apparatus 10 operator to subjectively determine the intensity or brightness level of backlit film transparency 120. Once this determination has been made, the apparatus 10 operator manually rotates the light polarizing element 38B to a position that will align the index mark 48 on the frame member 24 with a selected point on the light transmission scale 44 that will allow the proper proportion of light from the backlit image 120 to be transmitted to photosensitive material within the apparatus 10 for the optimum exposure thereof. With additional reference to FIGS. 6 and 7 of the drawings, copying apparatus 10 is shown being held by a camera operator in its framing and exposure positions, respectively. As shown in FIG. 6, the apparatus 10 operator has grasped the frame member hand grip 30 with his left hand, has grasped the housing hand grip 18 with his right hand and has rotated the frame member 24 from the position as shown in drawing FIG. 1B to the position shown in drawing FIG. 1A after the index mark 48 on the frame member 24 has been manually aligned with the above-mentioned point on the light transmission scale 44. In addition, the operator has placed the opening 28 of the frame member 24 over a selected portion of the backlit transparent image 120 such that the outer surfaces of the pads 36A, 36B, 36C and 36D projecting therefrom are in direct physical contact with the adjacent surface of the image 120. When the operator is satisfied that the selected image portion is properly framed by the appropriate positioning of the frame member 24 on the transparent image 120, he rotates the apparatus housing 12 from its framing position, as shown in FIG. 6, to its exposure position, as shown in FIG. 7, where the housing opening 14 (FIG. 1A) is in registration with the selected backlit image portion. After the housing 12 has been rotated into its exposure position the operator depresses a button 122 on the housing 12 adjacent his right thumb as shown in drawing FIG. 7 to thereby initiate copying of the selected portion of illuminated image 120 by the apparatus 10.

The depression of the button 122 couples the conventional microlens assembly drive motor (not shown) to a battery (not shown) within the copying apparatus 10. This drive motor, in turn, drives the microlens assembly across the housing opening 14 and across intermediate wall opening 58 in registration therewith to thereby transfer the selected portion of backlit image 120 located at the plane defined by the outer surfaces of the pad members 36A, 36B, 36C and 36D, to the photosensitive film unit 110 located at the film plane of the copying apparatus 10. Upon completion of this image-transferring process the microlens assembly motor (not shown) is de-energized and the motor (not shown) that is coupled to the conventional film advancing apparatus (not shown) and the processing rollers 116A and 116B is then automatically energized. The pick or arm (not shown) forming a part of the film advancing apparatus and being driven by this motor transports the exposed film unit 110 into the bite of the spread rollers 116A and 116B. These rotating rollers rupture the pod of processing liquid located at the leading edge of the film unit 110 and spread its contents between certain layers thereof to initiate the formation of a visible image, as previously explained. The rollers 116A and 116B subsequently move the exposed and processed film unit 110 out into ambient light through the light sealed opening 22 in the copier housing 12. The conventional limit switch then interrupts power to the processing roller drive motor and thereby terminates the rotation of the processing roller pair 116A and 116B and the image-copying cycle.

It should be noted that the light polarizing filters 38A and 38B employed in the preferred embodiment have been described herein as being located between the illuminated image to be copied and the lens array 66. Other less preferable arrangements for these light polarizing elements might include their placement between the lens array 66 and the camera's film plane or the placement of one light polarizing element between the illuminated image to be copied and the lens array 66 and the other light polarizing element between the lens array 66 and the camera's film plane.

From the foregoing description of the invention it will be apparent to those skilled in the art that various improvements and modifications can be made in it without departing form its true scope. The embodiment described herein is merely illustrative and should not be viewed as the only embodiment that might encompass the invention.

What is claimed is:

1. An exposure control system usable in photographic apparatus for controlling the transmission of image forming light rays along a light path from an illuminated image to photosensitive material located in a film plane, said system comprising:

means for defining a film plane;

means for defining an illuminated plane in which the illuminated image is adapted to be positioned;

an array of image-transferring graded-index lenses mounted for movement across a light path which extends between said illuminated image plane and said film plane, between an initial position and a terminal position, said lens array including a plurality of lenses, each of which includes an image end and an object end, with said image ends having a substantially common image plane located substantially coincident with said film plane and said object ends having a common focal plane located substantially coincident with said illuminated image plane;

a pair of superposed light polarizing elements positioned in the light path and interposed between said illuminated image plane and said array of lenses, with a light transmission axis of one light polarizing element being manually rotatable with respect to a light transmission axis of the other light polarizing element to select the desired amount of illuminated-image-light to be transmitted to said film plane; and means coupled to said array of lenses for driving said array at a predetermined rate across said light path, from its said initial position to its said terminal position, to thereby transfer an illuminated image present at said illuminated image plane, of a selected intensity, to photosensitive material present at said film plane.

2. Hand held compact apparatus for photographically copying an illuminated image comprising:

a housing including means defining an opening therein for the passage of image-carrying light rays therethrough;

means for defining a first plane in which photosensitive material is adapted to be positioned within said housing;

means for defining a second plane in which the illuminated image is to be located for copying;

an array of image-transferring graded-index lenses mounted within said housing in a lighttight relation with respect to said housing opening, said array being mounted for movement across said housing opening between an initial position and a terminal position, said lens array including a plurality of lenses, each of which includes an image end and an object end, with said image ends having a substantially common image plane located substantially coincident with said first plane and said object ends having a common focal plane located substantially coincident with said second plane;

a pair of superposed light polarizing elements positioned in the path of said image-carrying light rays, with a light transmission axis of one light polarizing element being manually rotatable with respect to a light transmission axis of the other light polarizing element to select the desired amount of illuminated-image-light to be transmitted to said first plane; and means coupled to said array of lenses for driving said array at a predetermined rate across said housing opening, from its said initial position to its said terminal position, to thereby transfer an illuminated image present at said second plane, of a selected intensity, to photosensitive material present at said first plane.

3. The apparatus of claim 2 wherein each of said polarizing elements is a linear polarizer.

4. The apparatus of claim 2 wherein said light polarizing elements are interposed between said second plane and said array of lenses.

5. The apparatus of claim 4 wherein one of said polarizing elements is positioned adjacent said array of lenses, the other of said polarizing elements is positioned adjacent said second plane and said one polarizing element is mounted in a fixed position with respect to said housing.

6. The apparatus of claim 2 wherein said light polarizing elements are interposed between said array of lenses and said first plane.

7. The apparatus of claim 2 wherein one of said light polarizing elements is interposed between said second plane and said array of lenses and the other of said light polarizing elements is interposed between said array of lenses and said first plane.

8. The apparatus of claim 2 wherein one of said light polarizing elements is mounted in a fixed position with respect to and overlies said housing opening and said apparatus further comprises:

a frame member having an opening therein for placement over a selected portion of the illuminated image with the other of said light polarizing elements being rotatably mounted on said frame member, overlying the opening in said frame member; and means for coupling said frame member to said housing such that said housing may be moved between a framing position where said frame member together with said other light polarizing element may be placed over a selected portion of the illuminated image where it does not block a camera operator's view of the selected image portion, and an exposure position wherein said housing opening and said one polarizing element that overlies said housing opening are in registration with said frame member opening and with said other rotatably mounted light polarizing element such that said polarizing elements may collectively control the amount of illuminated image light to be transmitted to said first plane within said housing.

9. The apparatus of claim 8 wherein said frame member is pivotally attached to said housing for movement between said framing and exposure positions.

10. A method of photographically copying an illuminated image, comprising the steps of:

providing a lighttight housing having an opening therein and having means for locating photosensitive material at a film plane within said housing;

supporting the illuminated image in a plane defined by an outer surface of the housing, in alignment with the housing opening;

mounting an array of image-transferring graded-index lenses within the housing in a lighttight relation with respect to the housing opening, the array being mounted for movement across the housing opening between an initial position and a terminal position, the lens array including a plurality of lenses, each of which includes an image end and an object end, with the image ends having a substantially common image plane located substantially coincident with film plane and the object ends having a common focal plane located substantially coincident with the outer housing surface plane;

precluding the transmission of illuminated-image light by the lenses when the array is positioned to either its initial or its terminal position;

placing a pair of superposed light polarizing elements in a light path between the outer housing surface plane and the array of lenses such that a light transmission axis of one light polarizing element may be manually rotated with respect to a light transmission axis of the other light polarizing element;

rotating one of the light polarizing elements with respect to the other light polarizing element to select the desired amount of illuminated-image-light to be transmitted to the film plane; and driving the array at a predetermined rate across the housing opening, from its initial position to its terminal position, to thereby transfer the illuminated image present at the outer housing surface plane, of a selected intensity, to the film plane and to photosensitive material present thereat.

* * * * *